United States Patent [19]
Yoshida

[11] Patent Number: 5,936,611
[45] Date of Patent: *Aug. 10, 1999

[54] ON-SCREEN DISPLAYING APPARATUS

[75] Inventor: Hiroyuki Yoshida, Gunma-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,970

[22] Filed: Oct. 31, 1996

[30]  Foreign Application Priority Data

Nov. 2, 1995  [JP]  Japan ................................... 7-286165

[51] Int. Cl.$^6$ ........................................... G09G 5/08
[52] U.S. Cl. ......................... 345/158; 345/146; 345/169
[58] Field of Search .................................... 345/146, 156, 345/158, 169; 348/114

[56]  References Cited

U.S. PATENT DOCUMENTS

| | | | |
|---|---|---|---|
| 5,367,316 | 11/1994 | Ikezaki | 345/158 |
| 5,422,682 | 6/1995 | Nakade | 348/732 |
| 5,450,079 | 9/1995 | Dunaway | 345/169 |
| 5,604,544 | 2/1997 | Bertram | 345/158 |
| 5,606,374 | 2/1997 | Bertram | 345/158 |
| 5,629,733 | 5/1997 | Youman et al. | 345/146 |
| 5,650,831 | 7/1997 | Farwell | 345/158 |

OTHER PUBLICATIONS

"Widevision Display Toshiba 32 DW2E", *HiVi*, Aug. 8, 1995, pp. 138–139.

*Primary Examiner*—Amare Mengistu
*Assistant Examiner*—Ricardo Osorio
*Attorney, Agent, or Firm*—Pillsbury Madison & Sutro LLP

[57]  ABSTRACT

The on-screen displaying apparatus displays the remote control hand unit and its keypad graphically on the CRT 9 screen and changes the mode to help mode when the [MENU] key, for example, of the remote control hand unit 10 is pressed. In this help mode, when the user presses an arbitrary key on the remote control hand unit, the displayed key corresponding to the actually pressed key changes color or blinks on said CRT screen. At the same time, a functional description (the main points of the functional description described in the manual) of the key is displayed on said CRT screen. The user can use all the functions of any apparatus by using the remote control functions effectively even though he/she forgets the remote operational procedure or loses the manual.

12 Claims, 7 Drawing Sheets

TO SELECT TV OR VIDEO INPUT MODES

ON-SCREEN DISPLAYING APPARATUS

BACKGROUND OF THE INVENTION

1. Field of the Invention

The present invention relates to an on-screen displaying apparatus, and more particularly to an on-screen displaying apparatus for displaying a help screen (description) for remote control operation on the image screen of a display unit with remote control functions.

2. Description of the Related Art

Conventionally, to operate a display unit with remote control functions from a remote location, the user had to perform such remote control operation with reference to the remote control operation procedure described in an instruction manual (hereinafter called manual) or after mastering such procedure prior to actual operation.

However, in recent years, with the development of multifunctional remote control operation, it has become impossible to perform a certain operation on the apparatus body, especially in an audiovisual apparatus. For many models recently released, such operation is possible only by a remote controller. Therefore, some degree of practice is required for the user to operate an apparatus with multiple remote control functions by operating a remote controller. To master its operation procedure, the user must have a manual at hand for reference.

In recent years, more electrical apparatuses are equipped with remote control functions. Therefore, it is necessary for each user to master the operation procedures of a plurality of remote controllers. However, it is almost impossible for the user to memorize the operational procedures of many remote control functions (including functions only rarely used) of many electrical apparatuses and to operate them at his will. Therefore, the manual had been indispensable to the user. Even though the user masters the operational procedures of all the remote controllers of all the electrical apparatus he/she has, he/she will forget such procedures of the apparatus or the rarely used functions. In such a case, the user used to refer to the manual describing such procedures.

However, in many cases, the manual contains many items which are difficult to understand for the ordinary user without special knowledge. Especially, it is difficult for the user to find an item (operation procedure) he/she wants to know about at once. In some cases, when the user misplaces or loses the manual, he/she could not operate an apparatus he/she wants to use.

SUMMARY OF THE INVENTION

It is an object of the present invention to provide an on-screen displaying apparatus which displays remote control functions on the screen so that the user can operate an electrical apparatus even though the user forgets its remote control operation procedure or he/she loses the manual.

It is another object of the present invention to provide an on-screen displaying apparatus which can improve the operability of an electrical apparatus by using its remote control functions effectively.

An on-screen displaying apparatus according to a first embodiment of the present invention comprises an image displaying means; a remote control hand unit; a means for changing the mode to help mode when a predetermined key on the remote control hand unit is pressed; a means for displaying the function description of a key on the image displaying means when a key on the remote control hand unit is pressed in help mode.

An on-screen displaying apparatus according to a second embodiment of the present invention comprises an image displaying means; a remote control hand unit; a means for changing the mode to help mode when a predetermined key on the remote control hand unit is pressed and at the same time for displaying the remote control hand unit body and its keypad graphically on the image displaying means; a means for displaying the functional description of key on the image displaying means when the key on the remote control hand unit is pressed in help mode.

According to the first and second embodiments of the present invention, the functional description of a pressed key on the remote control hand unit can be displayed by pressing the key. Therefore, the user can easily check the function (operation procedure) even though he/she loses or misplaces the manual.

An on-screen displaying apparatus according to a third embodiment of the present invention comprises an image displaying means; a remote control hand unit; a means for changing the mode to help mode when a predetermined key on the remote control hand unit is pressed and at the same time for displaying the remote control hand unit body and its keypad graphically on the image displaying means; a means for changing the display status of a key on the remote control hand unit graphically displayed on the image displaying means so that the user can recognize a pressed key when a key on the remote control hand unit is pressed in help mode; a means for displaying the functional description of the pressed key together with the remote control hand unit on the image displaying means.

An on-screen displaying apparatus according to a fourth embodiment of the present invention is characterized in that the means for changing the key display status in the on-screen displaying apparatus of the third embodiment changes the color of the key being graphically displayed on the image displaying means corresponding to the pressed key or blinks the key.

An on-screen displaying apparatus according to a fifth embodiment of the present invention is characterized in that the means for displaying the functional description displays the functional descriptions of various keys on the remote control hand unit successively in a predetermined order on the image displaying means whenever a predetermined key on the remote control hand unit is pressed in the on-screen displaying apparatus of the on-screen displaying apparatus of the first, second or third embodiments of the present invention.

According to the third, fourth and fifth embodiments of the present invention, the remote control hand unit body and its keypad can be displayed on the image displaying means. Therefore, when the user presses a key on the remote control hand unit at hand, the pressed key changes in color or blinks and at the same time the functional description of the key is displayed on the image displaying means. So the user can easily know the function (operation procedure) of the key even through he/she loses or misplaces the manual.

DETAILED DESCRIPTION OF THE PREFERRED EMBODIMENTS

The embodiments of the present invention will be described below with reference to the accompanied drawings.

Figure 1:
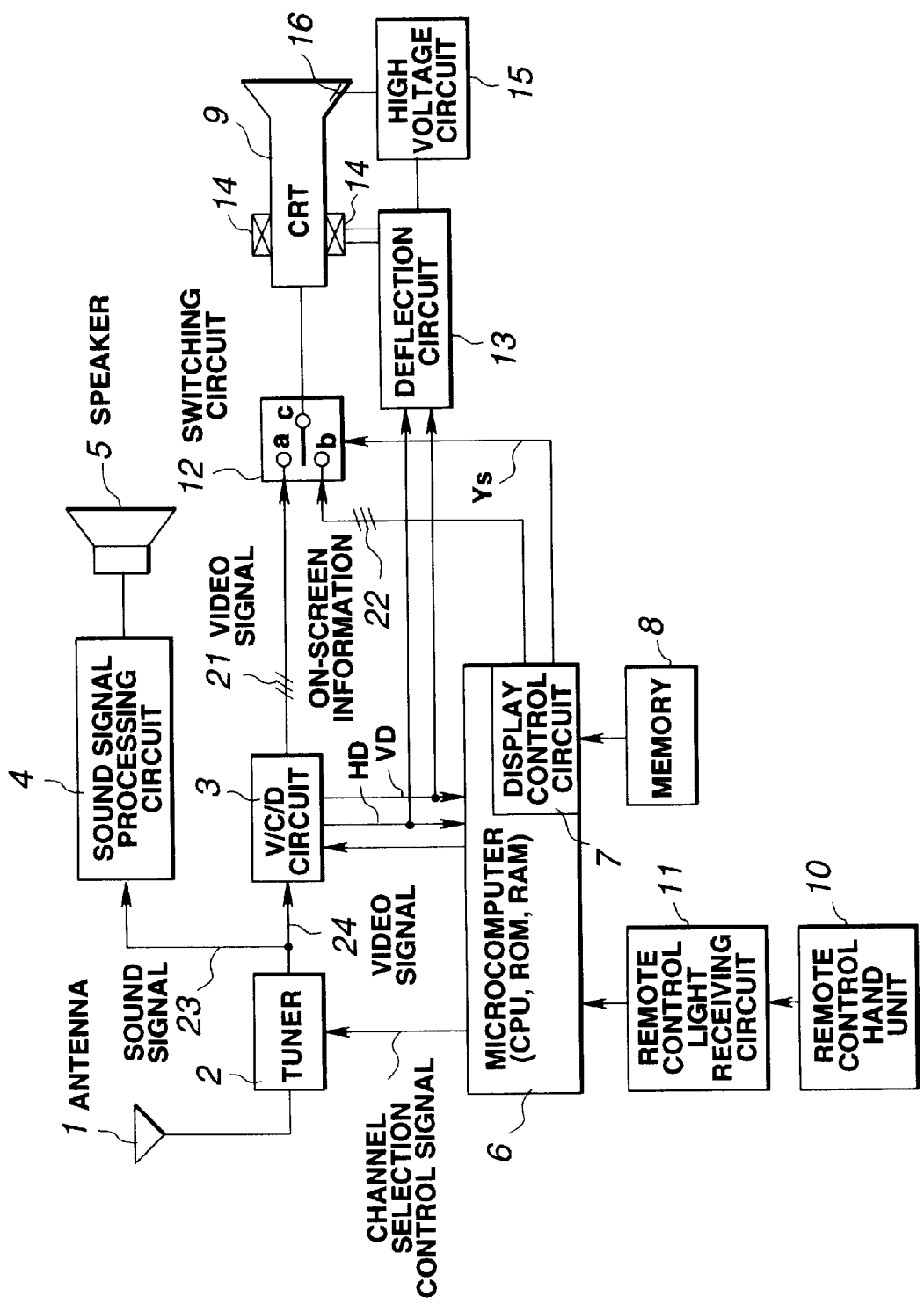
FIG. 1 shows a block diagram of one embodiment of an on-screen displaying apparatus according to the present invention.

FIG. 1 is a block diagram illustrating one embodiment of an on-screen displaying apparatus according to the present invention.

The on-screen displaying apparatus of FIG. 1 comprises an antenna 1 for receiving a TV broadcasting signal; a tuner 2 for select the signal from the antenna 1, converting such signal into intermediate frequency signal (hereinafter called IF signal), detecting image and sound signals and finally outputting composite color video signal 24 and sound signal 23; a video chroma deflection processing circuit 3 (hereinafter called V/C/D circuit) for subjecting the composite color video signal 24 to video chroma deflection processing and outputting the horizontal synchronizing signal HD, the vertical synchronizing signal VD and the video signal (R, G, B) 21; a sound signal processing circuit 4 for performing various processing for the sound signal 23 such as amplification; a speaker 5; a deflection circuit 13 for controlling the deflection of the beam in CRT 9 by means of a deflection yoke 14 in accordance with the horizontal synchronizing signal HD and the vertical synchronizing signal VD from the V/C/D circuit 3; a high voltage circuit 15 for applying a high voltage to the anode 16 of the CRT 9; a microcomputer 6 comprising a CPU, ROM, RAM and an on-screen display control circuit 7 for controlling the tuner 2, a V/C/D circuit 3, a switching circuit 12; an external memory 8 for storing on-screen information, channel selection data, etc.; a remote control hand unit 10 for outputting the remote control signal; a remote control light receiving circuit 11 for receiving the remote control signal and transmitting it to the microcomputer 6.

The operation of the above-mentioned circuits will be described below.

The TV signal received by the antenna 1 is selected and converted into the IF signal by the tuner 2. At the same time, the video signal and the sound signal in such TV signal are detected. Then, the resulting composite color video signal 24 is sent to the V/C/D circuit 3 and the resulting sound signal 23 is fed to the sound signal processing circuit 4 respectively. The sound signal 23 sent to the sound signal processing circuit 4 is subjected to various processing including amplification. The resulting sound signal is supplied to the speaker 5 to be output to the air (the space) as the sound information.

Meantime, the microcomputer 6 receives the user's command signal from the remote control hand unit 10 through the remote control light receiving circuit 11, and controls the tuner 2 (channel selection control, etc.) and the V/C/D circuit 3 (brightness control, etc.). The microcomputer 6 incorporates an on-screen display control circuit 7. (Of course, the on-screen display control circuit 7 may be used separately.) The external memory 8 storing the data for channel selection and the data for on-screen display such as characters and graphs is connected with the microcomputer 6. The on-screen display control circuit 7 outputs on-screen information (r, g, b signal) 22 to the input terminal b of the switching circuit 12 in accordance with the data read out from the external memory 8 under the control of the microcomputer 6 based on the user's command signal.

The video signal (R, G, B signal) 21 which was subjected to the video chroma deflection processing by the V/C/D circuit 3 and outputted to the input terminal a of the switching circuit 12 and the on-screen information (r, g, b signal) 22 are switched over by the display control signal Ys which is outputted from the on-screen display control circuit 7 to the switching circuit 12. By so doing, the signal to be outputted from the output terminal c of the switching circuit 12 is changed over. As a result, an image in accordance with the video signal (R, G, B signal) 21 is only displayed on the CRT 9 screen, or an image obtained by superimposing the on-screen information (r, g, b signal) 22 on the video signal 21 is displayed or the on-screen information 22 is only displayed according to the above-mentioned signal change-over.

In addition, the horizontal synchronizing signal HD and the vertical synchronizing signal VD are separated in the V/C/D circuit 3. These synchronizing signals are sent to the microcomputer 6 and the deflection circuit 13. The deflection circuit 13 supplies the deflection current to the deflection yoke 14 in accordance with such synchronizing signals for the horizontal and vertical scanning. The high voltage circuit 15 is connected with the deflection circuit 13, so the high voltage is applied to the anode 16 of the CRT 9.

An example of the operational procedure (the help processing operation in help mode) as an essential process of the on-screen displaying apparatus of the present invention will be described below.

Figure 2:
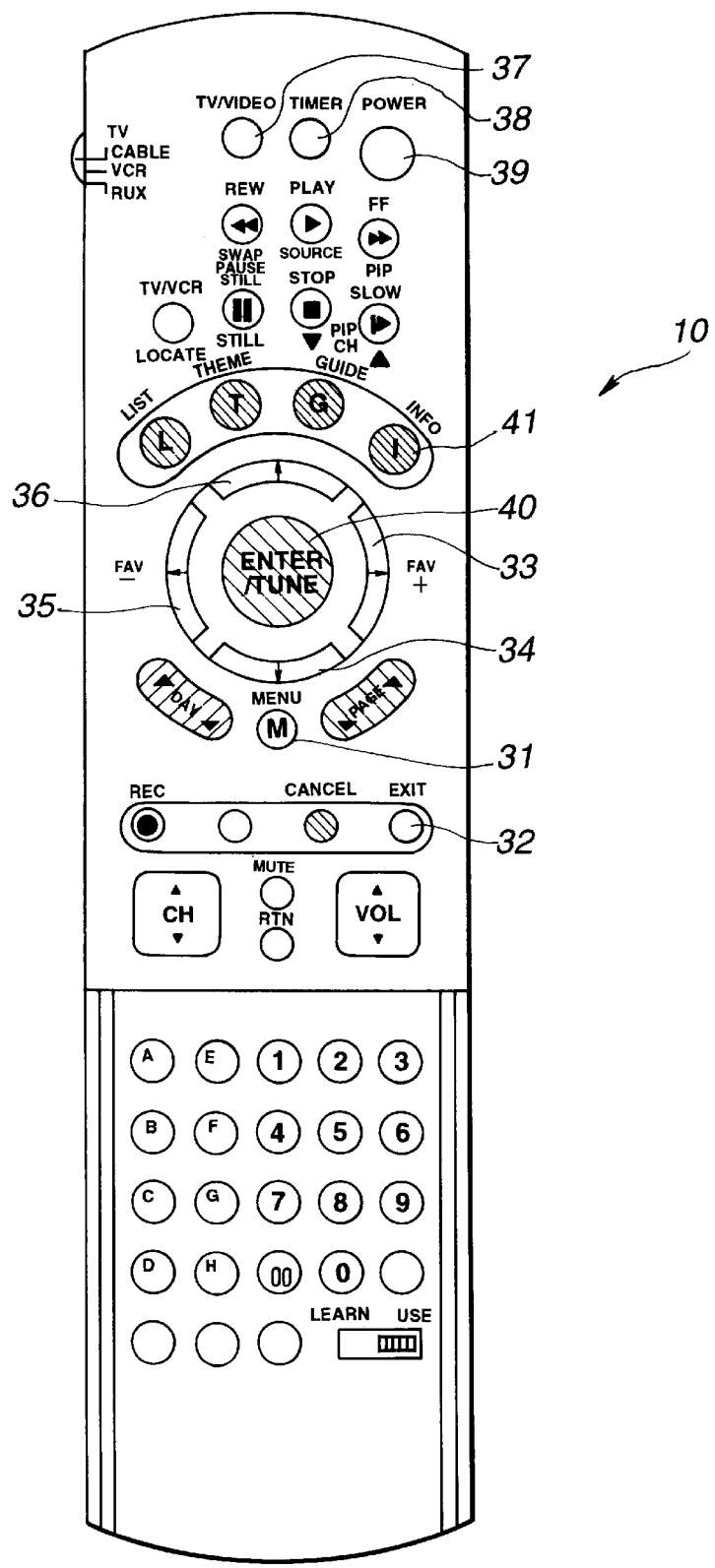
FIG. 2 shows an example of the remote control hand unit for operating an on-screen displaying apparatus according to the present invention.
Figure 3:
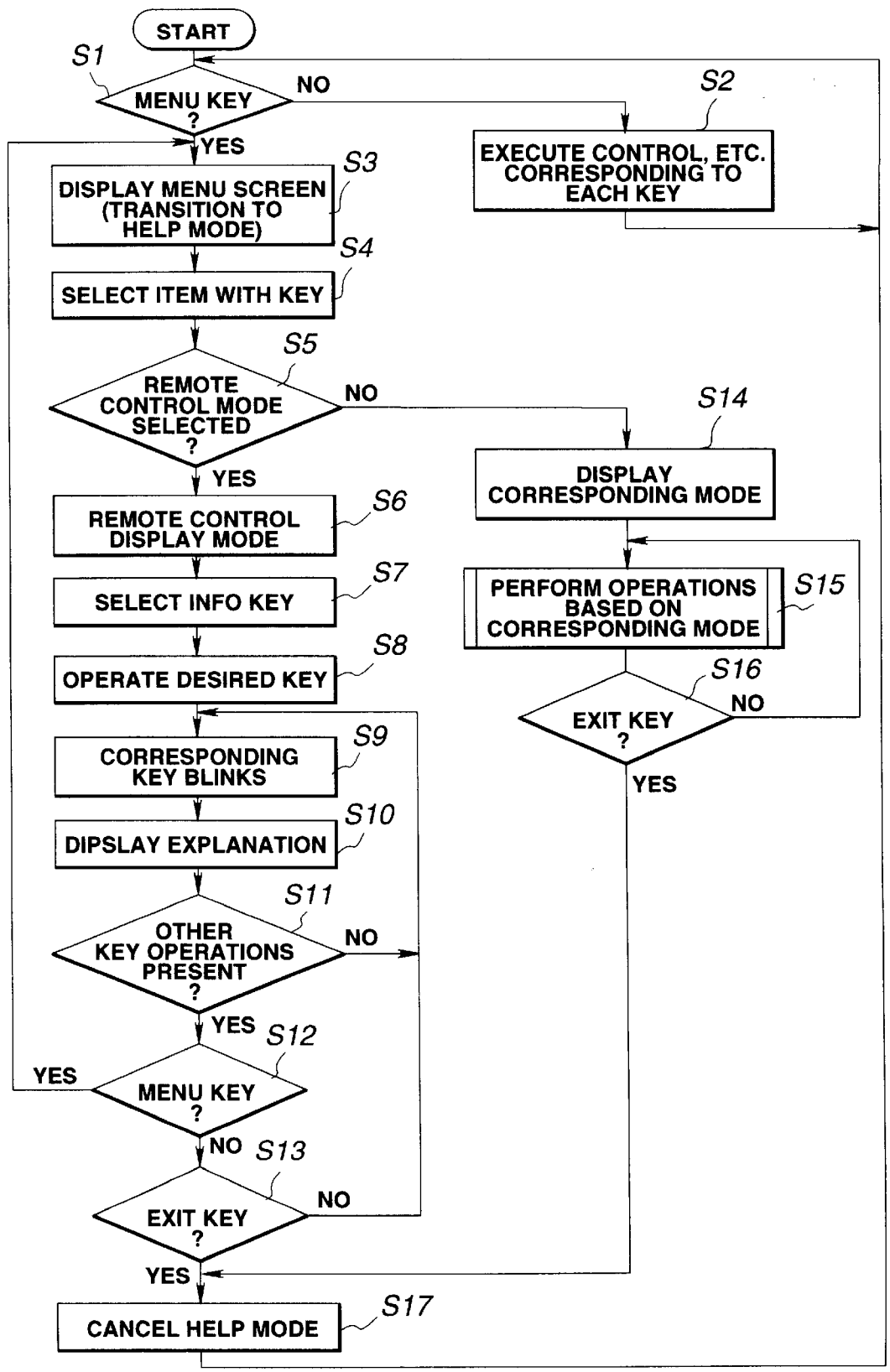
FIG. 3 shows a flowchart of one embodiment of the operation procedures by the remote control function for explaining the working of an on-screen displaying apparatus according to the present invention.

FIG. 2 shows an example of the remote control hand unit 10 used for operating the on-screen displaying apparatus of the present invention. FIG. 3 shows a flowchart of the operational procedure of the remote control hand unit for operational the on-screen displaying apparatus of the present invention.

According to the present invention, when a predetermined key, for example, the MENU key (or HELP key which is not shown in FIG. 2) on the remote control hand unit 10 is pressed, the mode is changed over to the help mode and the remote control hand unit body 10 and its keypad are graphically displayed on the screen (the display screen) of the CRT 9 by performing the predetermined operation. When the user presses a key on the remote control hand unit 10, the corresponding key displayed graphically on the display screen blinks or changes in color. At the same time, the functional description (the main points of the functional description described in the manual) of the key is displayed on the display screen.

FIG. 2 shows an example of the multifunctional remote control hand unit equipped with alot of operation keys for operating a TV and a VCR.

Figure 4:
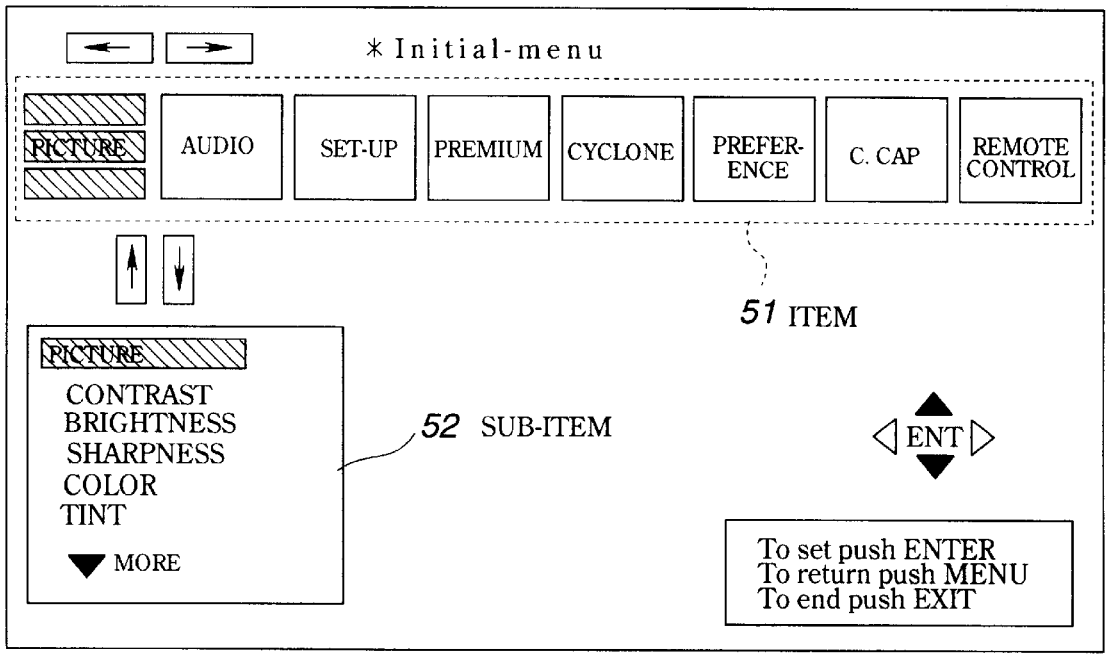
FIG. 4 shows the screen on which [PICTURE] is selected as an item name to be set.

FIG. 4 shows an example of the menu screen (front page) for setting various functions of the image displaying apparatus with remote control functions.

The help functions (in help mode) of the on-screen displaying apparatus of the present invention will be described below in accordance with the operational procedure shown in the flowchart of FIG. 3 with reference to FIGS. 2 and 4.

If the [MENU] key 31 on the remote control hand unit is pressed, the mode is changed over to the help mode and, for example, the menu screen (front page) as shown in FIG. 4 is displayed on the display screen of the CRT 9 (steps S1 and S3). If a key other than the [MENU] key 31 is pressed on the remote control hand unit 10, the processing goes to step S2 and the usual control corresponding to each key is made.

The names of the following items (items 51) to be set are displayed on the menu screen (front page): [PICTURE], [AUDIO], [SET-UP], [PREMIUM], [CYCLONE], [PREFERENCE], [C.CAP], [REMOTE CONTROL], etc. By pressing the [→] key 33 or the [←] key 35, one of the above-mentioned items 51 can be selected. In this case, if the [ENTER] key 40 is pressed on the remote control hand unit 10, the item now selected (highlighted) is set. If the [EXIT] key 32 is pressed, the help mode is canceled and the mode changes from the help mode (the menu screen (front page)) to the ordinary mode.

FIG. 4 shows the screen on which [PICTURE] is selected (highlighted) (in the hatched section in this figure). Under this condition, if the [→] key 33 is pressed, [AUDIO] on the right is selected. If the [→] key 33 is continuously pressed, the highlighted portion moves to the right successively. Conversely, if the [←] key 35 is continuously pressed, the highlighted portion moves to the left successively, and the highlighted item (the hatched portion in this figure) of items 51 is selected (steps S4, S5 and S14).

In this case, the sub-items 52 of the selected item, that is, the adjustment (setting) sub-items regarding the image, for example, [CONTRAST], [BRIGHTNESS], [SHARPNESS], [COLOR], [TINT], etc. are displayed. Similar to the selection procedure of the setting items (items 51), by pressing the [↑] key 36 and the [↓] key 34, the user can move the highlighted portion (the hatched portion in the figure, hereinafter called highlighted bar) to select adjustment (setting) sub-item.

Figure 5:
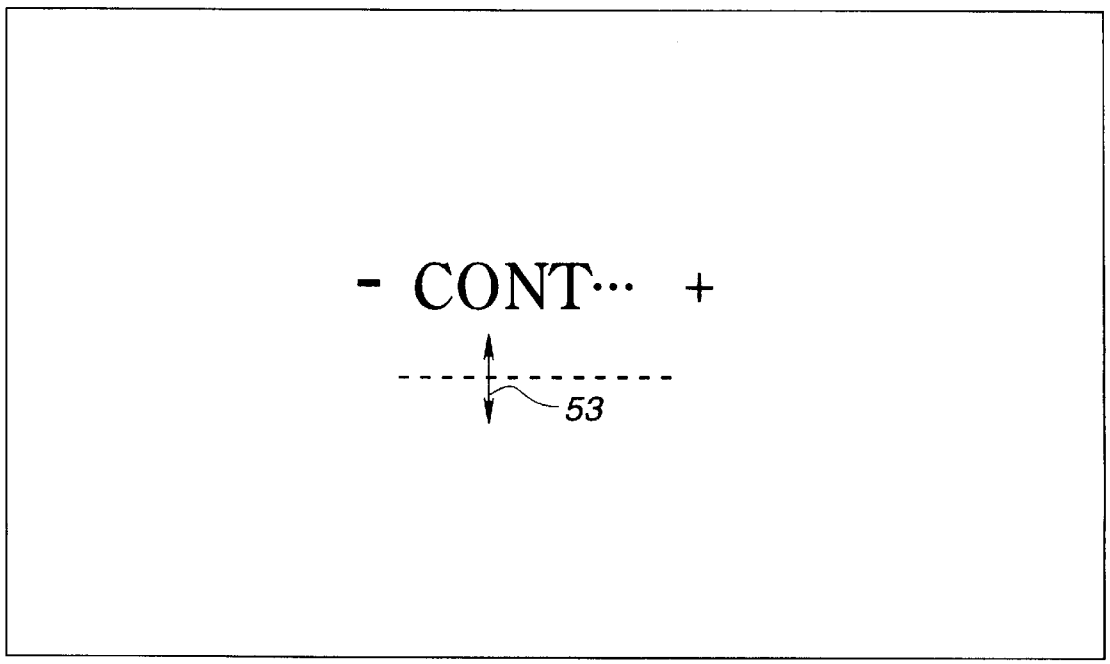
FIG. 5 shows a screen for performing CRT contrast adjustment.

FIG. 5 shows the screen for performing the contrast adjustment of the CRT 9.

After selecting one of the sub-items (for example, [CONTRAST]) on the menu screen (front page), by pressing the [ENTER] key 40 on the remote control hand unit 10, the selected item is set. In accordance with such setting, the screen is changed over to the contrast adjustment screen, as shown in FIG. 5. The arrow 53 indicates the present set position of contrast. By pressing the [→] key 33 and the [←] key 35, the arrow 53 on the screen moves to the right and the left. By so doing, the degree (+,−) of contrast can be adjusted. After transferring from the menu screen (front page) to the next screen, by pressing the [MENU] key 31 on the remote control hand unit 10, the user can transfer back to the menu screen freely at any time (steps S12 and S1).

If another setting for the adjustment (setting) of the image is required afterwards, steps S15 and S16 executed repeatedly. After finishing the adjustment (setting) operation, press the [EXIT] key 32 on the remote control hand unit 10 to cancel the help mode, then the mode returns to the usual mode (steps S16, S17 and S1). After finishing the adjustment (setting) operation, by pressing the [MENU] key 31 on the remote control hand unit 10, the screen can also return to the front page.

A description of when the [REMOTE CONTROL] is selected (when the remote control mode is selected) in the menu screen (front page) in FIG. 4 will be described below.

Figure 6:
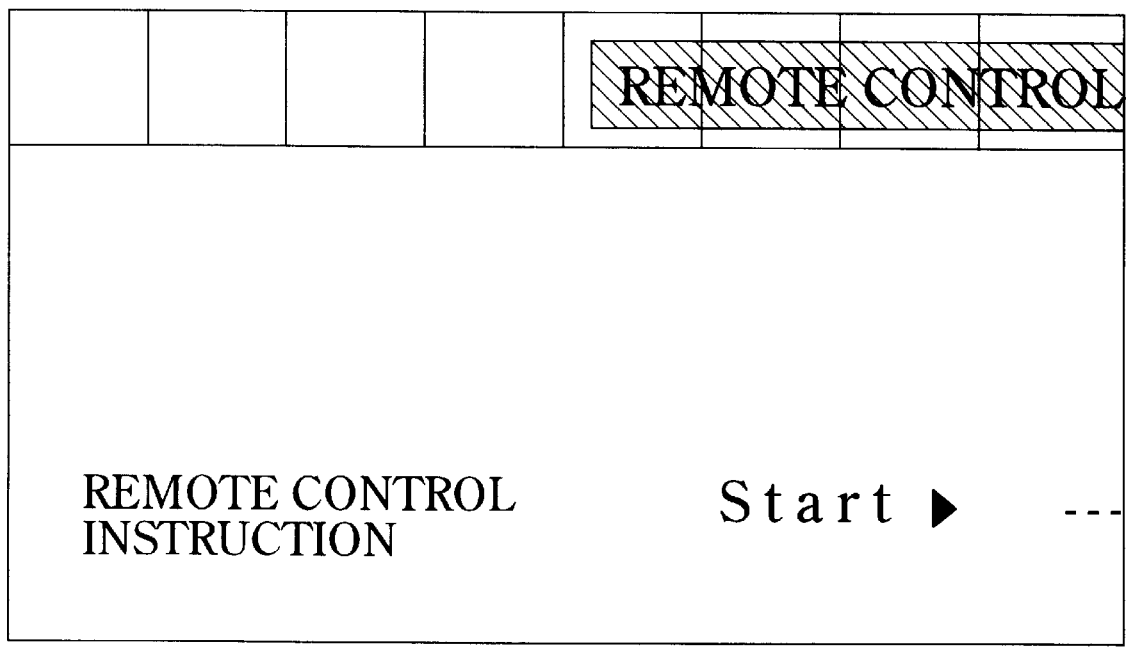
FIG. 6 shows an example of the display screen on which an item of [REMOTE CONTROL] is selected by operating the keypad on the remote control hand unit.

FIG. 6 shows an example of the display screen when the [REMOTE CONTROL] is selected in the item selection by operating the key on the remote control hand unit 10.

If the remote control mode is selected in step S4 in the above-mentioned flowchart, the mode is changed over to the remote control mode, as shown in FIG. 6 (steps S5 and S6).

Figure 7:
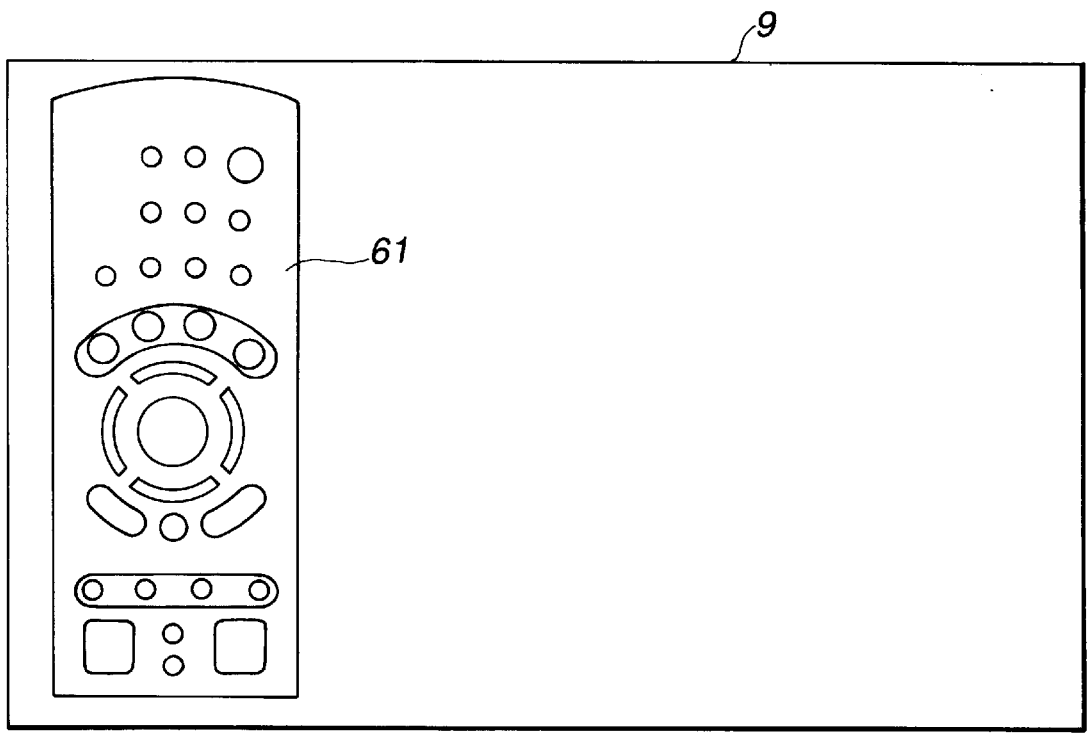
FIG. 7 shows an example of the screen on which the remote control hand unit body and its keypad are graphically displayed.

If the [→] key 33 is pressed on the remote control hand unit 10 while the image shown in FIG. 6 is being displayed on the above-mentioned display screen, the keypad (picture) 61 shown in FIG. 7, similar to that of the remote control hand unit 10, is graphically displayed on the display screen.

FIG. 7 shows an example of the image (picture) of the body and the keypad similar to those of the remote control hand unit 10.

If the [INFO] key 41 (information key) is pressed, the mode is changed over to the functional description mode of each key on the remote control hand unit 10 (step S7). By pressing the key on the remote control hand unit 10 for which the functional description is required (step S8), the displayed corresponding key on the key pad similar to that of the remote control hand unit 10 blinks or changes in color compared with the color of other keys. At the same time, the functional description of the key (the main points of the functional description described in the manual) is displayed on the display screen (steps S9 and S10). The detailed example will be described below.

Figure 8:
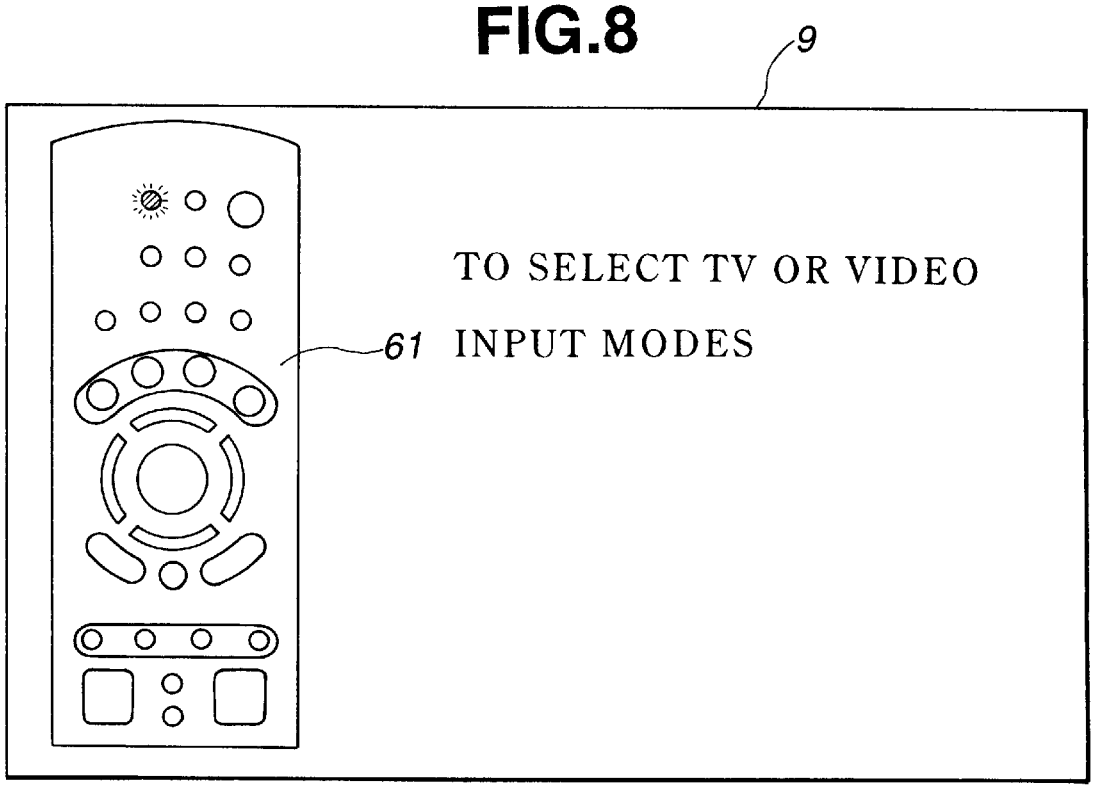
FIG. 8 shows an example of the screen on which the functional description of a key on the remote control hand unit is displayed in characters.

FIG. 8 shows an example of the functional descriptions of the keys on the remote control hand unit 10 in characters.

For example, if the [TV/VIDEO] key 37 is pressed on the remote control hand unit 10, the corresponding key displayed on the display screen blinks. At the same time, the message shown in FIG. 8, ("TO SELECT TV OR VIDEO INPUT MODE.") is displayed on the display screen to notify the user that the TV can be changed over to the VCR or vice versa by pressing this key. If the [POWER] key 39 is pressed on the remote control hand unit 10, the corresponding key (not shown) displayed on the display screen blinks. At the same time, the message ("TO TURN ON, PRESS AGAIN TO TURN OFF") is displayed to notify that the user can turn on the power by pressing this key and turn off the power by pressing this key once again.

Table 1 shows an example of the functional descriptions (messages output in English) by pressing each key on the remote control hand unit 10.

TABLE 1

| BUTTON FUNCTION | DESCRIPTION FOR EXPLAINING FUNCTION |
| --- | --- |
| TV/VIDEO | TO SELECT TV OR VIDEO INPUT MODES |
| MUTE | TO MUTE THE SOUND |
| POWER | TO TURN ON, PRESS AGAIN TO TURN OFF |
| TIMER, TIMER/CLOCK | TO SELECT AUTOMATIC TURN OFF WITHIN 10 TO 180 MIN, AND TO SET THE CLOCK |
| VOLUME (UP) ▲ | TO INCREASE SOUND LEVEL |
| CHANNEL (UP) ▲ | GO TO NEXT CHANNEL WHEN TUNING AND IN CH. GUIDE |
| VOLUME (DOWN) ▼ | TO DECREASE SOUND LEVEL |
| CHANNEL (DOWN) ▼ | GO TO PREVIOUS CHANNEL WHEN TUNING AND IN CH. GUIDE |
| MENU | DISPLAY MENU |

In the above description, when the image shown in FIG. 7 is displayed on the display screen, the displayed corresponding key, for example, the [TV/VIDEO] key 37 or the [POWER] key 39 is pressed on the remote control hand unit 10 to display its functional description on the display screen. However, for this purpose, the user may press any specific key repeatedly to display the functional description required without directly pressing the key in question. That is, in another embodiment, when the image shown in FIG. 7 is displayed on the screen, the user can select various keys on the remote control hand unit 10 successively by pressing a specific key on the remote control hand unit, for example, one of the [→] key 35, [←] key 33, [↑] key 36 and [↓] key 34 repeatedly and can display the functional description of the selected key successively. For example, when the [→] key 33 is pressed repeatedly, each time it is pressed, the portion corresponding to the [TV/VIDEO] key 37, the [TIMER] key 38, the [POWER] key 39 . . . is highlighted. In this case, if it is necessary to display the functional description of a key, highlight (select) the key by pressing the [→] key 33 and blink the key at a timing when the user takes his/her finger off the [→] key 33, then the functional description is displayed on the display screen.

As described above, when a key is selected when the image shown in FIG. 7 is being displayed on the screen, as shown in FIG. 8, the displayed key corresponding to the selected key changes color or blinks on the image of the remote control hand unit 61 on the CRT screen. At the same time, the functional description of the key is displayed on the display screen. However, it goes without saying that if it is so desired, the remote control hand unit 61 may indicate that the current mode is the functional description display mode, only displaying the key functional description without blinking and changing color of the selected key displayed.

After the user understands the corresponding key functional description (message output), he/she can return to the front page shown in FIG. 4 by pressing the [MENU] key 31 (steps S11, S12, S3) or he/she can cancel the help mode and return to the usual operation mode by pressing the [EXIT] key 32 (steps S13, S17 and S1).

Figure 9:
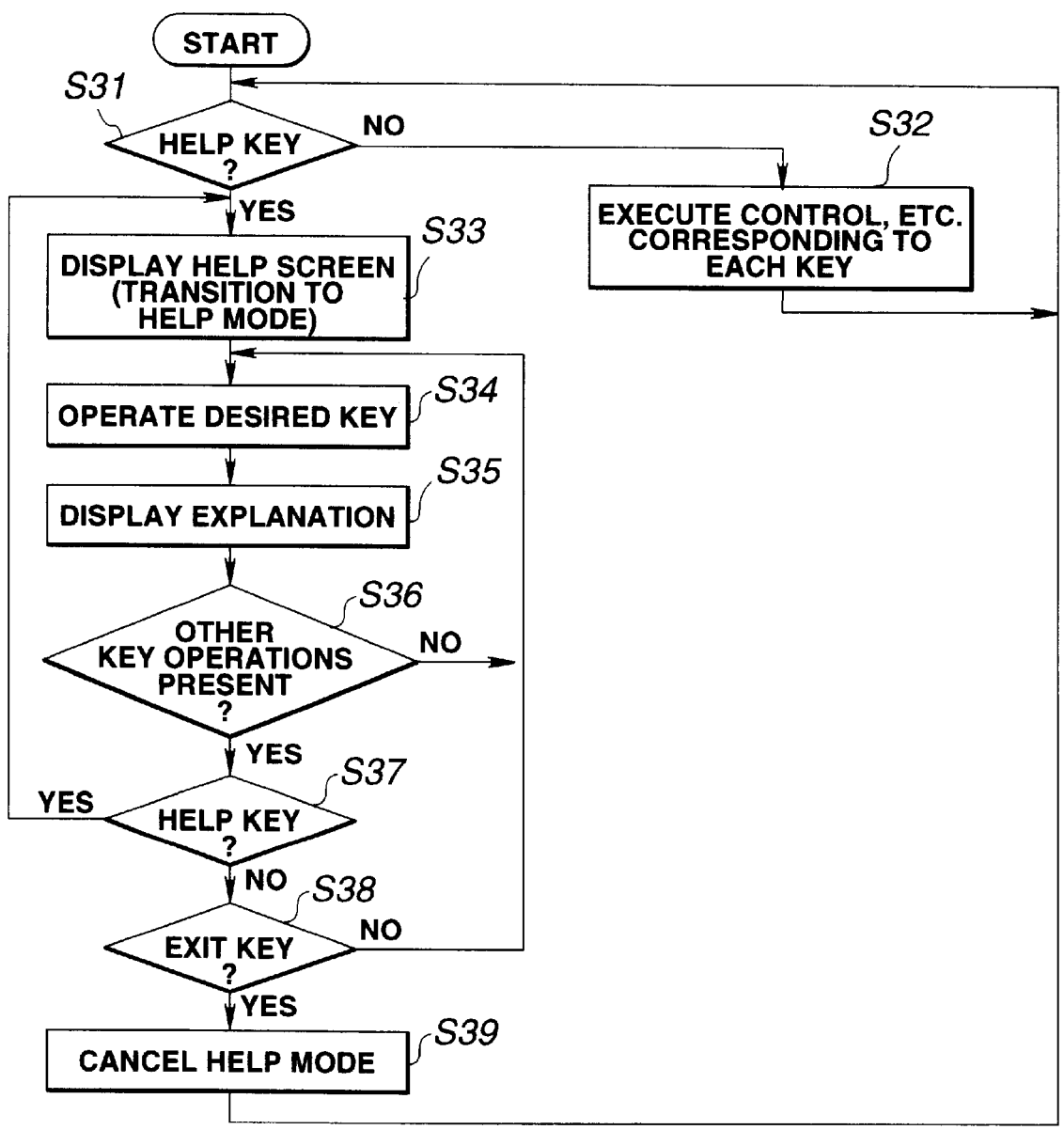
FIG. 9 shows a flowchart of another embodiment of the operational procedure by the remote control function for explaining the working of an on-screen displaying apparatus according to the present invention.

FIG. 9 shows a flowchart of another embodiment of the operational procedure of the on-screen displaying apparatus of the present invention by operating the remote control function. In this embodiment, the [HELP] key which is used to change over the mode to the remote control key functional description mode (help mode) is provided on the remote control hand unit 10 shown in FIG. 2. In this case, the mode is changed over to the help mode by pressing the [HELP] key, then the functional description of each selected key can be displayed by pressing one of various keys such as the [TV/VIDEO] key 37, the [POWER] key 39, etc. on the remote control hand unit 10, as described above. That is, an on-screen display screen for the remote control key a functional description of a selected key can be displayed only by pressing the [HELP] key. In this case, it is not necessary to pass through the process of the changeover from the menu screen (front page) to the screen of the remote control hand unit body by pressing the [MENU] key as shown in the flowchart in FIG. 3.

The key functional description function (in help mode) will be described in accordance with the operational procedure shown in the flowchart in FIG. 9.

If the [HELP] key is pressed on the remote control hand unit, the mode is changed over to the help mode and the functional description help screen is displayed on the display screen (steps S31 and S33). If a key other than the [HELP] key is pressed on the remote control hand unit, the processing goes to step S32 and the control corresponding to each key is made.

By pressing the key for which the functional description is required on the remote control hand unit (step S34), the function description of such key (the main points of the functional description described on the manual) is displayed on the screen (step S35). For example, if the [TV/VIDEO] key is pressed on the remote control hand unit, the message ("TO SELECT TV OR VIDEO INPUT MODE") is displayed on the display screen to notify the user that the TV can be changed over to the VCR or vice versa by pressing this key.

After the user understands the functional description (message output) of the key in question, the user can return to the initial state (for example, blue screen) of the help screen of the function description (steps S36, S37 and S33) by pressing the [HELP] key or the user can cancel the help mode and return to the usual operation mode by pressing the [EXIT] key (steps S38, S39 and S31).

In the embodiment of FIG. 3, the remote control hand unit body 61 and its keypad, which are graphically displayed on the screen of the CRT 9 as shown in FIGS. 7 and 8, can be displayed separately on the CRT 9 or can be displayed superimposedly on an image generated from another video signal from the V/C/D circuit 3 by controlling the switching circuit 12. Similarly, the functional description of an arbitrary key pressed on the remote control hand unit 10 can be separately displayed on the CRT 9, or can be displayed superimposedly on an image generated from the other video signal from the V/C/D circuit 3 by controlling the switching circuit 12.

As described above, the user can display the functional description of the keys of the so-called multifunctional remote controller having many keys by a simple operational, if he/she does not know or forgets its operation procedure. Therefore, even though the user loses or misplaces the manual, he/she can know its functions (operational procedure). In addition, by displaying the keypad (picture) 61 corresponding to the actual one at hand on the screen, the user can understand it more easily.

According to the present invention, the user can display an image corresponding to the actual remote control hand unit on the screen, and also can display the functional description of any remote control key only by pressing a key on the remote control hand unit at hand. Therefore, the user can check the functions (operational procedure) of an electrical apparatus even though he/she loses or misplaces the manual. As a result, the operability of electrical apparatuses can be improved.

The present invention is not limited to the above-mentioned embodiments. Various variations and modifications are possible without departing from the spirit and the scope of the present invention.

What is claimed is:

1. An on-screen displaying apparatus comprising:
   a controlled instrument including means for displaying an image;
   a remote control hand unit comprising a plurality of operation keys and a help key for remotely controlling the controlled instrument;
   means for changing a mode to a help mode by pressing the help key on the remote control hand unit and for displaying, on the means for displaying the image, a graphic image of an arrangement of keys corresponding, respectively, to all of the keys arranged on the remote control hand unit; and
   means for displaying a functional description which, when an arbitrary key of the remote control hand unit is pressed, while in the help mode, displays a functional description of the pressed arbitrary key together with the graphic image on the means for displaying the image.

2. An on-screen displaying apparatus comprising:

a controlled instrument including means for displaying an image;

a remote control hand unit comprising a plurality of operation keys and a help key for remotely controlling the controlled instrument;

means for changing a mode to a help mode by pressing the help key on the remote control hand unit and for displaying, on the means for displaying the image, a graphic image of an arrangement of keys corresponding, respectively, to all of the keys arranged on the remote control hand unit;

means for changing a key display state which, when an arbitrary key of the remote control hand unit is pressed while in the help mode, changes a display state of an image of a key, corresponding to the pressed arbitrary key, in the graphic image so that a user can recognize the pressed arbitrary key; and means for displaying a functional description of the arbitrary key, pressed while in the help mode, together with the graphic image on the means for displaying the image.

3. The on-screen displaying apparatus of claim 2, wherein the means for changing the key display state changes a color of or blinks the arbitrary key being graphically displayed on the means for displaying the image.

4. The on-screen displaying apparatus of claim 1 or 2, wherein the means for displaying the functional description displays a functional description of respective operation keys of the remote control hand unit successively in a predetermined order on the means for displaying the image whenever a first key, predetermined among the plurality of operation keys of the remote control hand unit, is pressed while in the help mode.

5. The on-screen displaying apparatus of claim 1 or 2, wherein the graphic image of the arrangement of the keys, as displayed by the means for displaying the image, is displayed singly or superimposedly on another image displayed by the means for displaying the image.

6. The on-screen displaying apparatus of claim 1 or 2, wherein the functional description of the pressed arbitrary key of the remote control hand unit, as displayed on the means for displaying the image, is displayed singly or superimposedly on another image displayed by the means for displaying the image, together with the graphic image of the arrangement of the keys.

7. A remote control hand unit for use with an on-screen displaying apparatus comprising:

a remote control hand unit, constructed and arranged to control a controlled instrument including a display, the remote control hand unit comprising a plurality of operation keys and a help key for remotely controlling the controlled instrument;

means for changing a mode to a help mode by pressing the help key on the remote control hand unit and for causing to be displayed on the display, a graphic image of an arrangement of keys corresponding, respectively, to all of the keys arranged on the remote control hand unit; and means for causing a functional description to be displayed on the display, which, when an arbitrary key of the remote control hand unit is pressed, while in the help mode, causes a functional description of the pressed arbitrary key together with the graphic image to be displayed on the display.

8. A remote control hand unit for use with an on-screen displaying apparatus comprising:

a remote control hand unit, constructed and arranged to control a controlled instrument including a display, the remote control hand unit comprising a plurality of operation keys and a help key for remotely controlling the controlled instrument;

means for changing a mode to a help mode by pressing the help key on the remote control hand unit and for causing to be displayed on the display, a graphic image of an arrangement of keys corresponding, respectively, to all of the keys arranged on the remote control hand unit;

means for changing a key display state which, when an arbitrary key of the remote control hand unit is pressed while in the help mode, changes a display state of an image of a key, corresponding to the pressed arbitrary key, in the graphic image so that a user can recognize the pressed arbitrary key; and means for causing a functional description of the arbitrary key, pressed while in the help mode, to be displayed on the display together with the graphic image.

9. The remote control hand unit of claim 8, wherein the means for changing the key display state causes a change of color of or blinks the arbitrary key being graphically displayed on the display.

10. The remote control hand unit of claim 7 or 8, wherein the means for causing the functional description to be displayed causes a functional description of respective operation keys of the remote control hand unit to be displayed successively in a predetermined order on the display whenever a first key, predetermined among the plurality of operation keys of the remote control hand unit, is pressed while in the help mode.

11. The remote control hand unit of claim 7 or 8, wherein the graphic image of the arrangement of the keys, as displayed by the display, is displayed singly or superimposedly on another image displayed by the display.

12. The remote control hand unit of claim 7 or 8, wherein the functional description of the pressed arbitrary key of the remote control hand unit, as displayed on the display, is displayed singly or superimposedly on another image displayed by the display, together with the graphic image of the arrangement of the keys.

* * * * *